United States Patent [19]

Lee et al.

[11] Patent Number: 5,787,189
[45] Date of Patent: Jul. 28, 1998

[54] BIOLOGICAL ANALYSIS SYSTEM SELF CALIBRATION APPARATUS

[75] Inventors: Shih-Jong J. Lee, Bellevue; Seho Oh, Mukilteo; Chih-Chau L. Kuan; Dayle G. Ellison, both of Redmond; Wendy R. Bannister, Seattle, all of Wash.

[73] Assignee: NeoPath, Inc., Redmond, Wash.

[21] Appl. No.: 667,292

[22] Filed: Jun. 20, 1996

Related U.S. Application Data

[63] Continuation of Ser. No. 309,115, Sep. 20, 1994, abandoned.

[51] Int. Cl.$^6$ .................................................. G06K 9/00
[52] U.S. Cl. ............................................. 382/133; 382/224
[58] Field of Search ............................... 382/128, 133, 382/134, 224, 227, 321; 395/924; 128/630

[56] References Cited

U.S. PATENT DOCUMENTS

| | | |
|---|---|---|
| 3,824,393 | 7/1974 | Brain . |
| 4,175,860 | 11/1979 | Bacus . |
| 4,199,748 | 4/1980 | Bacus . |
| 4,202,033 | 5/1980 | Strobel . |
| 4,523,278 | 6/1985 | Reinhardt et al. ............... 364/413 |
| 4,932,044 | 6/1990 | Williams et al. ................ 377/10 |
| 4,965,725 | 10/1990 | Rutenberg . |
| 5,018,209 | 5/1991 | Bacus ............................. 382/6 |
| 5,072,382 | 12/1991 | Kamentsky . |
| 5,107,422 | 4/1992 | Kamentsky et al. . |
| 5,134,662 | 7/1992 | Bacus et al. ..................... 382/6 |
| 5,163,095 | 11/1992 | Kosaka ............................ 382/6 |
| 5,202,931 | 4/1993 | Bacus ............................. 382/6 |
| 5,235,522 | 8/1993 | Bacus ............................. 364/497 |
| 5,257,182 | 10/1993 | Luck et al. . |
| 5,281,517 | 1/1994 | Bacus et al. ..................... 435/6 |
| 5,287,272 | 2/1994 | Rutenberg et al. . |
| 5,315,700 | 5/1994 | Johnston et al. . |
| 5,361,140 | 11/1994 | Hayenga et al. . |

OTHER PUBLICATIONS

Bacus, James W. and Les J. Grace, "Optical Microscope System For Standardized Cell Measurement and Analyses", *Applied Optics*, 26:16, pp. 3280–3293, 15 Aug. 1987.

Bartels, Peter H. et al., "A Self–Learning Computer Program for Cell Recognition", *ACTA Cytologica: The Journal of Clinical Cytology*, 14:8, pp. 486–494, Oct. 1970.

Bartels, Peter H., "Numerical Evaluation of Cytologic Data: VII. Multivariate Significance Tests", *Analytical and Quantitative Cytology*, 3:1, Mar. 1981, pp. 1–8.

Breiman, Leo "Chapter 2: Introduction To Tree Classification", pp. 18–58, *Classification and Regression Trees*, Wadsworth & Brooks/Cole Advanced Books & Software, Pacific Grove, California, 1984.

Lee, James S. et al., "A Processing Strategy for Automated Papanicolaou Smear Screening", *Analytical and Quantitative Cytology andd Histology*, 14:5, Oct. 1992, pp. 415–425.

Tanaka, Noboru et al., "Automated Cytologic Screening System (CYBEST Model 4): an Integrated Image Cytometry System", *Applied Optics*, vol. 26, No. 16, pp. 3301–3307, Aug. 15, 1987. Copyright © 1987 by the Optical Society of America.

Duda, Richard O. and Peter E. Hart, "Fisher's Linear Discriminant", *Patent Classification and Scene Analysis*, Copyright ©1973, pp. 114–119.

(List continued on next page.)

*Primary Examiner*—Joseph Mancuso
*Attorney, Agent, or Firm*—Hans I. Sun; Emil Moffa

[57] ABSTRACT

Reference information for a biological slide is obtained. The reference information normalizes the measured object features. Calibrated feature measurement, not based on absolute measurements, self adjusts to match the situation of each slide, where each slide is characterized by the reference information. The reference may be different from slide to slide because of the preparation variations. The calibrated features will not carry the inter-slide variations. In addition, the reference information provides a good indication of the slide condition such as dark stained, air dried, etc. which can be used as slide features for the specimen classification. No alteration of the current practice of specimen preparation is required. The many slide context dependent features improve the classification accuracy of the objects in a specimen.

28 Claims, 10 Drawing Sheets

OTHER PUBLICATIONS

Weber, J.E. et al., "Fuzzy Reasoning, Possibility Theory and Probability Theory in Expert Systems for Histopathology", IEEE/Ninth Annual Conference of the Engineering in Medicine and Biology Society, pp. 1560–1562, ©1987.

Wied, G.L. et al., "Expert Systems as Classifiers in Diagnostic Cytopathology", IEEE/Ninth Annual Conference of the Engineering in Medicine and Biology Society, pp. 1915–1917, ©1987.

Wied, G.L. et al., "Expert System Design Under Uncertainty of Human Diagnosticians", IEEE/Eighth Annual Conference of the Engineering in Medicine and Biology Society, pp. 757–760, ©1986.

Wied, G.L. et al., "Ticas–Stratex, an Expert Diagnostic System For Stratified Cervical Epithelium", IEEE/Ninth Annual Conference of the Engineering in Medicine and Biology Society, pp. 1557–1559, ©1987.

Serra, J., *Image Analysis and Mathematical Morphology*, pp. 372–423, Academic Press, 1982.

Smith, Warren J., "Image Evaluation", *Modern Optical Engineering: The Design of Optical Systems*, McGraw–Hill Book Company, 1966, pp. 308–325.

Patten, Jr., Stanley, "Diagnostic Cytopathology of the Uterine Cervix", Basel, Switzerland, Publisher: S. Karger, 1969, 2nd Edition 1978, Third volume in *Monographs in Clinical Cytology*, edited by G.L. Wied, pp. 10–15.

Kurman, Robert J. et al., "Part 1: Specimen Adequacy and Part 2: Descriptive Diagnoses", *The Bethesda System for Reporting Cervical/Vaginal Cytologic Diagnoses*, Springer–Verlag.

Dytch, Harvey E. et al., "An Interactive Microcomputer-Based System for the Quantitative Analysis of Stratified Tissue Sections", *Analytical and Quantitative Cytology and Histology*, vol. 9, No. 1, pp. 69–78, Mar. 1987.

Enslein, Kurt and Peter W. Neurath, "Augmented Stepwise Discriminant Analysis Applied to Two Classification Problems in the Biomedical Field", *Computers and Biomedical Research*, 2, 568–581 (1969).

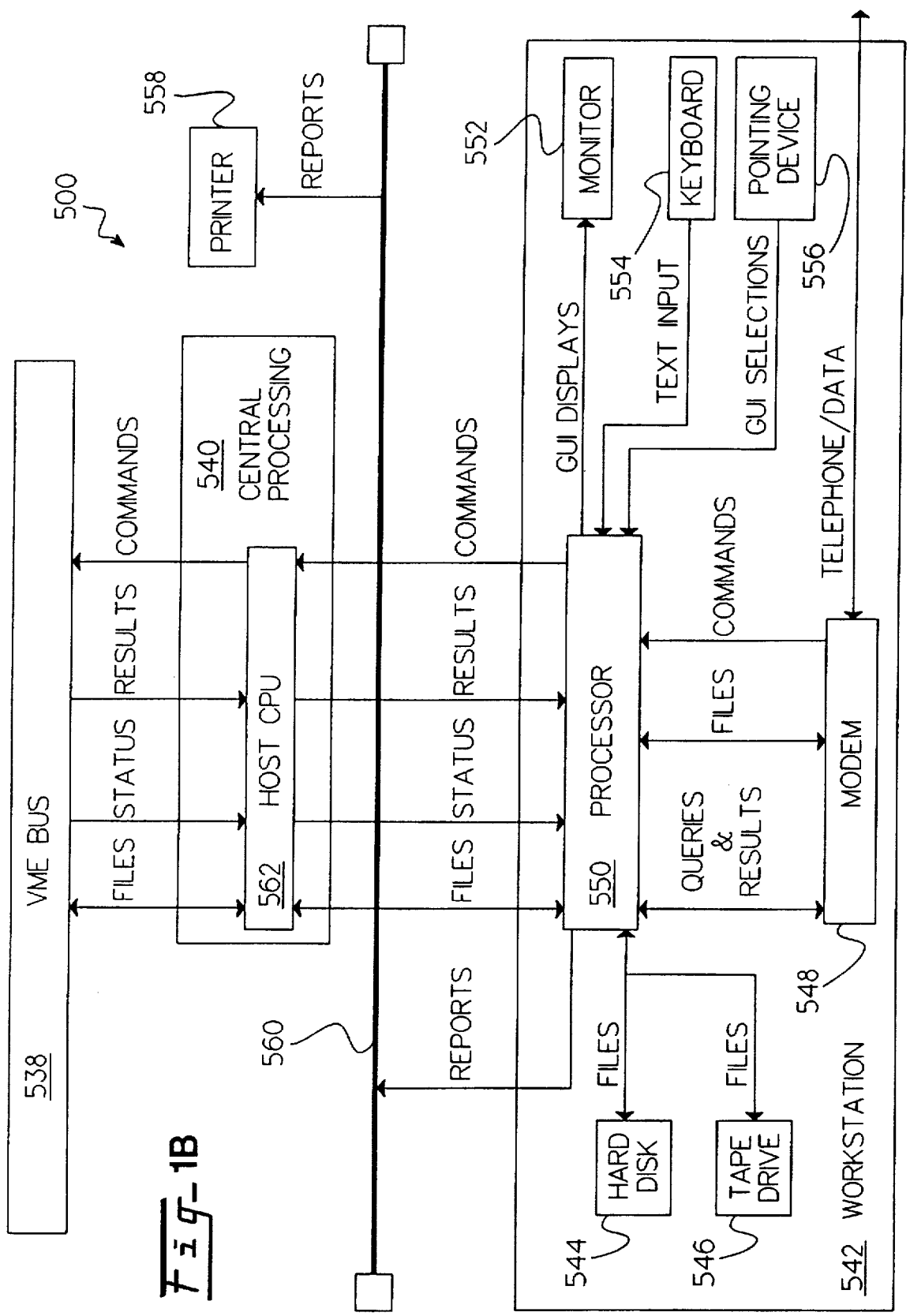

BIOLOGICAL ANALYSIS SYSTEM SELF CALIBRATION APPARATUS

This is a continuation of application Ser. No. 08/309,115, filed on Sep. 20, 1994, now abandoned.

This invention relates to an automated biological specimen classification system and more particularly to a self-calibrating automated biological specimen classification system.

BACKGROUND OF THE INVENTION

Conventionally prepared Pap Smear slides vary in presentation considerably from slide to slide. Such variation in presentation is sometimes referred to as "the specimen variation problem." These variations greatly degrade the discrimination potential derivable from cellular features or slide characteristics. It is generally accepted that, the ability of a cellular feature or slide characteristic to indicate normal vs. abnormal is limited by the great variations in appearance from slide to slide. The major source of variations are specimen sampling and preparation related including sampling tools, fixation methods, staining, and coverslip application, among others. The slide features that vary as a result include nuclear size, nuclear shape, nuclear density, chromatin patterns, cytoplasm size, cytoplasm density, and textures. The prior art relies on special preparation techniques such as fluid based fixation and special DNA staining to control the variations. However, they alter the current practice in Pap smear preparations and substantially increase cost.

Therefore, it is a motivation of the invention to provide a self-calibrating automated biological specimen classifier that adjusts for slide variations.

SUMMARY OF THE INVENTION

The self calibration method of the invention establishes reference information for each slide. The reference information for each slide is used to normalize measured object features. This results in calibrated feature measurement not based on absolute measurements. The apparatus of the invention self adjusts to match the situation of each slide, where each slide is characterized by the reference information. In this way, even the reference information may be different from slide to slide because of preparation variations. The calibrated features will not carry the inter-slide variations. In addition, the reference information provides a good indication of the slide condition such as dark stained, air dried, etc. which may be used as slide features for subsequent specimen classification.

The method provides a practical way to solve the specimen variation problem without the alteration of the current practice of specimen preparations.

The method generates many slide context dependent features to improve the classification accuracy of the objects in a specimen.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIGS. 1A, 1B and 1C show the automated cytology screening apparatus of the invention.

DETAILED DESCRIPTION OF THE PREFERRED EMBODIMENT

Figure 1A:
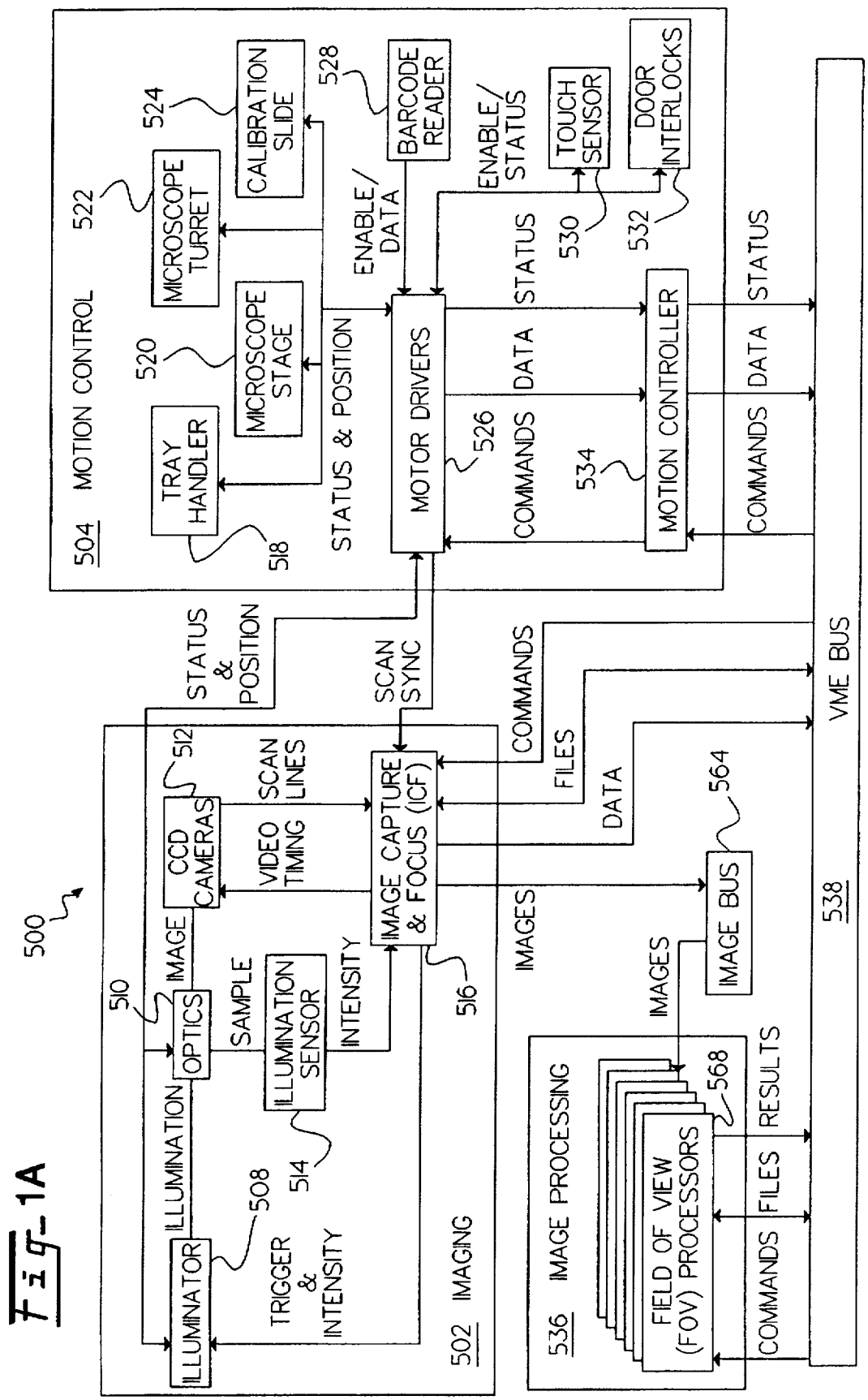
Figure 1C:
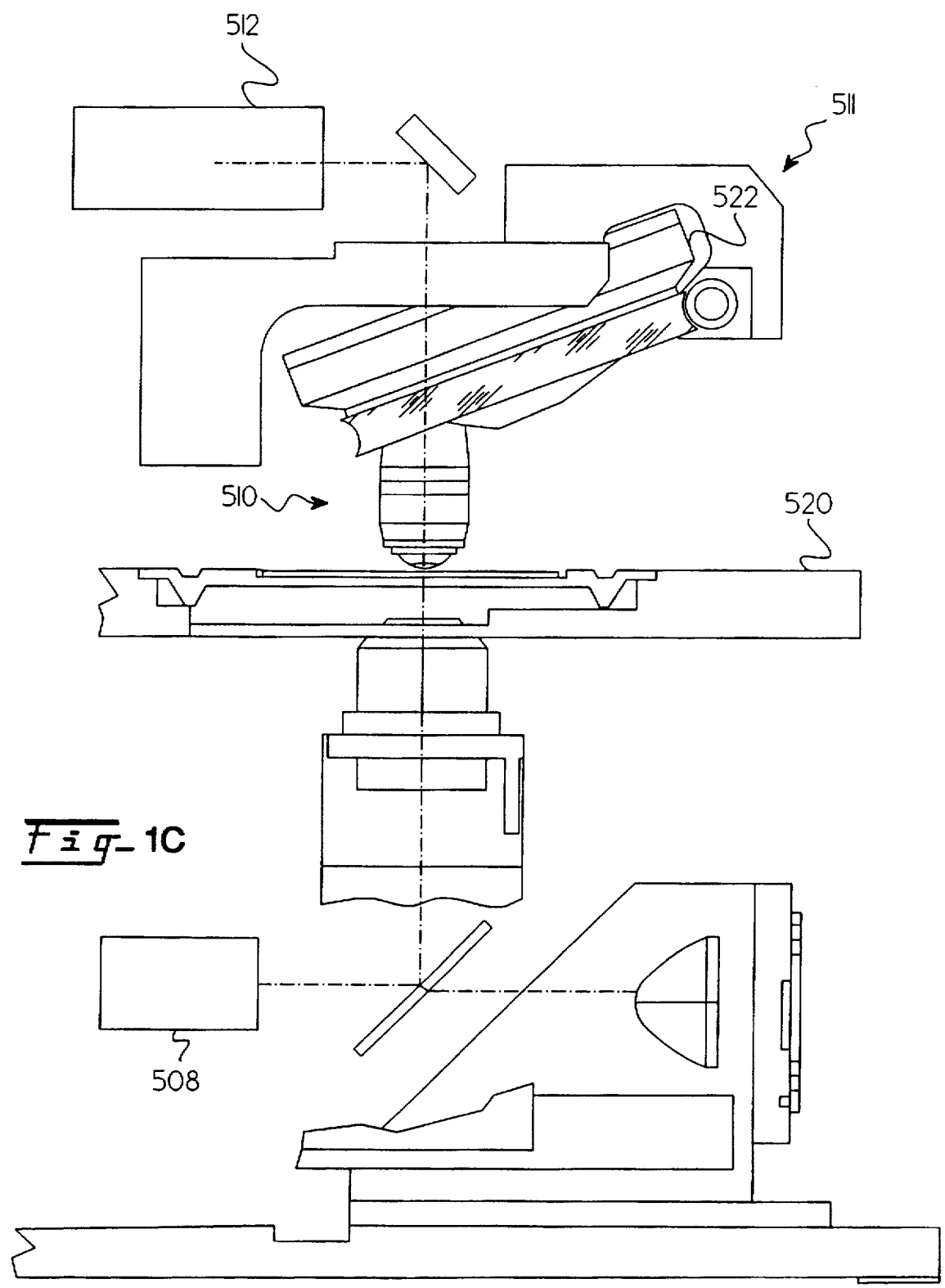

Now refer to FIGS. 1A, 1B and 1C which show a schematic diagram of the apparatus of the invention. The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a 68030 CPU. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by a Sun Spark Classic workstation 550. A tape drive 546 is connected to the Sun Spark Station as well as a modem 548, a monitor 552, a keyboard 554, and a mouse pointing device 556. A printer 558 is connected to the ethernet 560.

In a presently preferred embodiment of the invention, the system disclosed herein is used in a system for analyzing cervical pap smears, such as that shown and disclosed in U.S. patent application Ser. No. 07/838,064, entitled "Method For Identifying Normal Biomedical Specimens", by Alan C. Nelson, et al., filed Feb. 18, 1992; U.S. patent application Ser. No. 08/179,812 filed Jan. 10, 1994 which is a continuation in part of U.S. patent application Ser. No. 07/838,395, entitled "Method For Identifying Objects Using Data Processing Techniques", by S. James Lee, et al., filed Feb. 18, 1992; U.S. patent application Ser. No. 07/838,070, now U.S. Pat. No. 5,315,700, entitled "Method And Apparatus For Rapidly Processing Data Sequences", by Richard S. Johnston, et al., filed Feb. 18, 1992; U.S. patent application Ser. No. 07/838,065, filed Feb. 18, 1992, entitled "Method and Apparatus for Dynamic Correction of Microscopic Image Signals" by Jon W. Hayenga, et al.; and U.S. patent application attorney's docket No. 9/1799, filed Sep. 7, 1994 entitled "Method and Apparatus for Rapid Capture of Focused Microscopic Images" to Hayenga, et al., which is a continuation-in-part of application Ser. No. 07/838,063 filed on Feb. 18, 1992 the disclosures of which are incorporated herein, in their entirety, by the foregoing references thereto.

The present invention is also related to biological and cytological systems as described in the following patent applications which are assigned to the same assignee as the present invention, filed on even date herewith, and which are all hereby incorporated by reference including U.S. patent application Ser. No. 08/309,118, to Kuan et al. entitled, "Field Prioritization Apparatus and Method," U.S. patent application Ser. No. 08/309,061, to Wilhelm et al., entitled "Apparatus for Automated Identification of Cell Groupings on a Biological Specimen," U.S. patent application Ser. No. 08/309,116 to Meyer et al. entitled "Apparatus for Automated Identification of Thick Cell Groupings on a Biological Specimen," U.S. patent application Ser. No. 08/308,992, to Lee et al. entitled "Apparatus for Identification and Integration of Multiple Cell Patterns," U.S. patent application Ser. No. 08/309,063 to Lee et al. entitled "A Method for Cytological System Dynamic Normalization," U.S. patent application Ser. No. 08/309,248 to Rosenlof et al. entitled "Method and Apparatus for Detecting a Microscope Slide Coverslip," U.S. patent application Ser. No. 08/309,077 to Rosenlof et al. entitled "Apparatus for Detecting Bubbles in Coverslip Adhesive," U.S. patent application Ser. No. 08/309,931, to Lee et al. entitled "Cytological Slide Scoring Apparatus," U.S. patent application Ser. No. 08/309,148 to Lee et al. entitled "Method and Apparatus for Image Plane Modulation Pattern Recognition," U.S. patent application Ser. No. 08/309,250 to Lee et al. entitled "Apparatus for the Identification of Free-Lying Cells," U.S. patent application Ser. No. 08/309,209 to Oh et al. entitled "A Method and Apparatus for Robust Biological Specimen Classification," U.S. patent application Ser. No. 08/309,117, to Wilhelm et al. entitled "Method and Apparatus for Detection of Unsuitable Conditions for Automated Cytology Scoring."

It is to be understood that the various processes described herein may be implemented in software suitable for running on a digital processor. The software may be embedded, for example, in the central processor 540.

Figure 2:
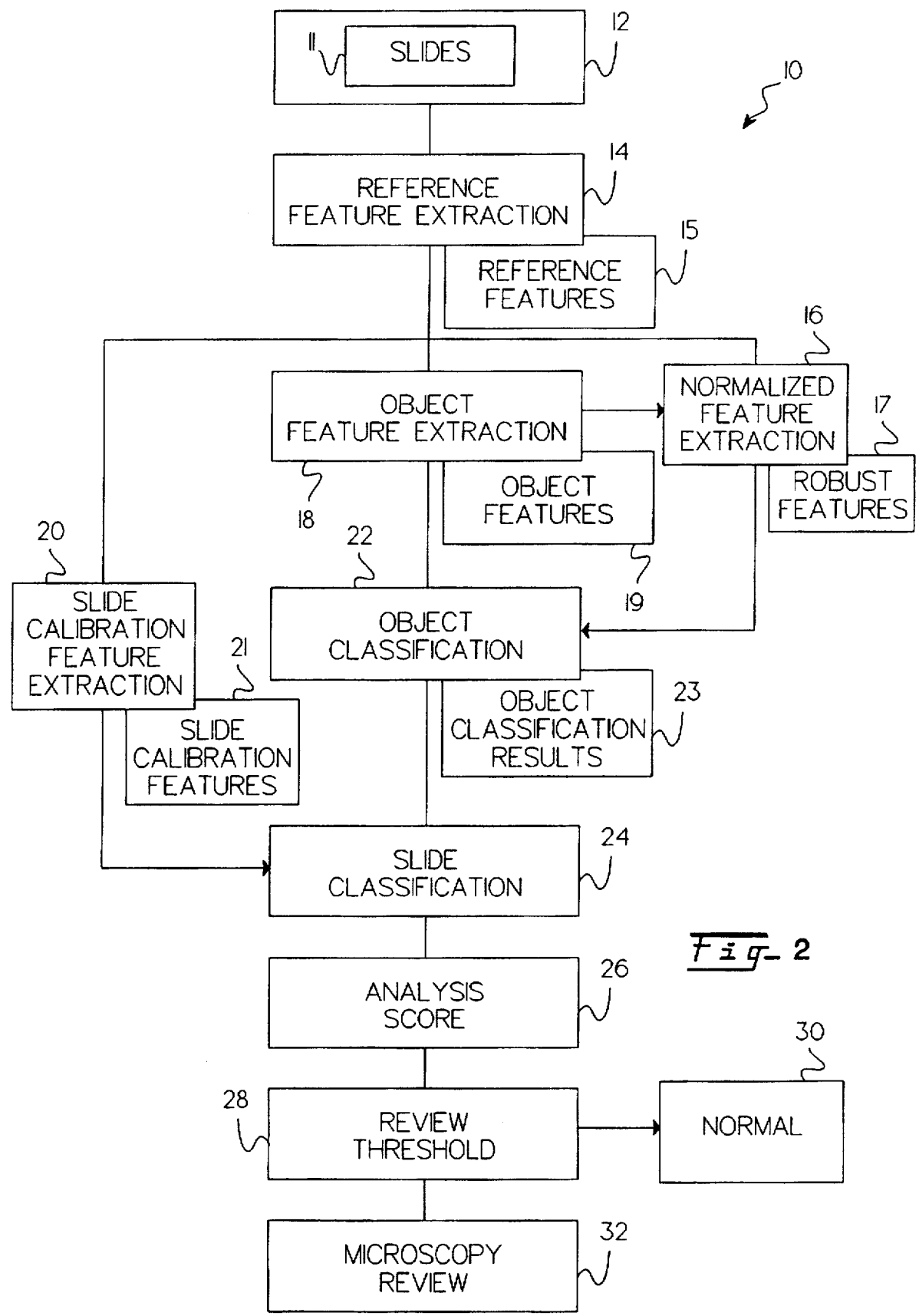
FIG. 2 shows a process flow diagram of the self calibration method of the invention.

Now refer to FIG. 2 which shows the slide sorting data flow of the method of the invention. A biological specimen such as a pap smear slide is loaded onto a slide processing system at step 12. The system processes the pap smear slides 11 and generates an analysis score 26. The slides 11 are sorted into normal 30 or microscopy review 32 categories based on a threshold 28 of the analysis score.

The decision logic is:

IF analysis score<normal threshold THEN normal ELSE microscopy review

The self calibration strategy starts with an initial scan 12 of a slide 11 to establish the reference features 15. The slide 12 is then re-scanned, after the reference features 15 are established in step 14. During the re-scanning process, object features 19 are extracted in step 18. The extracted object features 19 are calibrated by the reference features 15 to generate a set of robust features 17 in step 16. The robust features 17 along with the original object features 19 are used to perform object classification in step 22. The object classification results 23 are accumulated for the whole slide 11. A set of slide calibration features 21 are extracted from the reference features 15 in step 20. The extracted slide calibration features 21, combined with the accumulated object features 23, are then used by the slide classification step 24 to generate the anomaly score 26 also called the analysis score 26 for a slide.

In a preferred embodiment of invention, the pre-screening process scans up to a maximum number of reference cells or a maximum number of FOV's whichever comes first.

Reference cell characteristics are defined as follows. The characteristics for good reference cells include high prevalence, ease of detect ability, and good correlation to changes in objects of interest. The free-lying squamous intermediate cells are selected as reference cells for Pap smear screening. Those skilled in the art will recognize that other reference cell characteristics may be used.

Feature Descriptions

Figure 3:
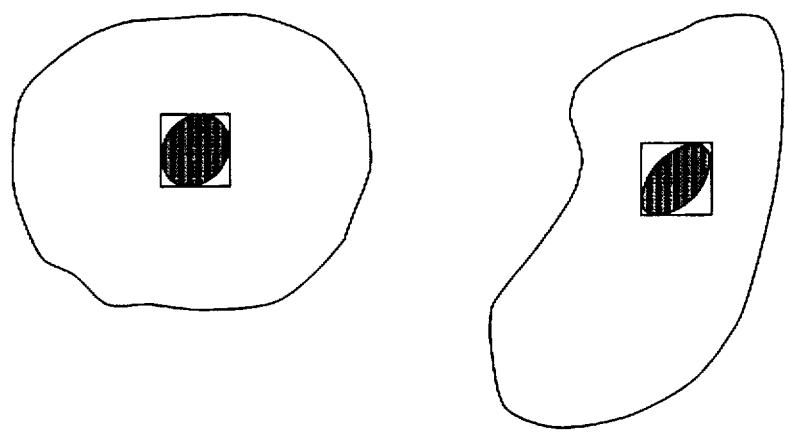
FIG. 3 shows a cell with a cell nucleus surrounded by a bounding box.
Figure 4:
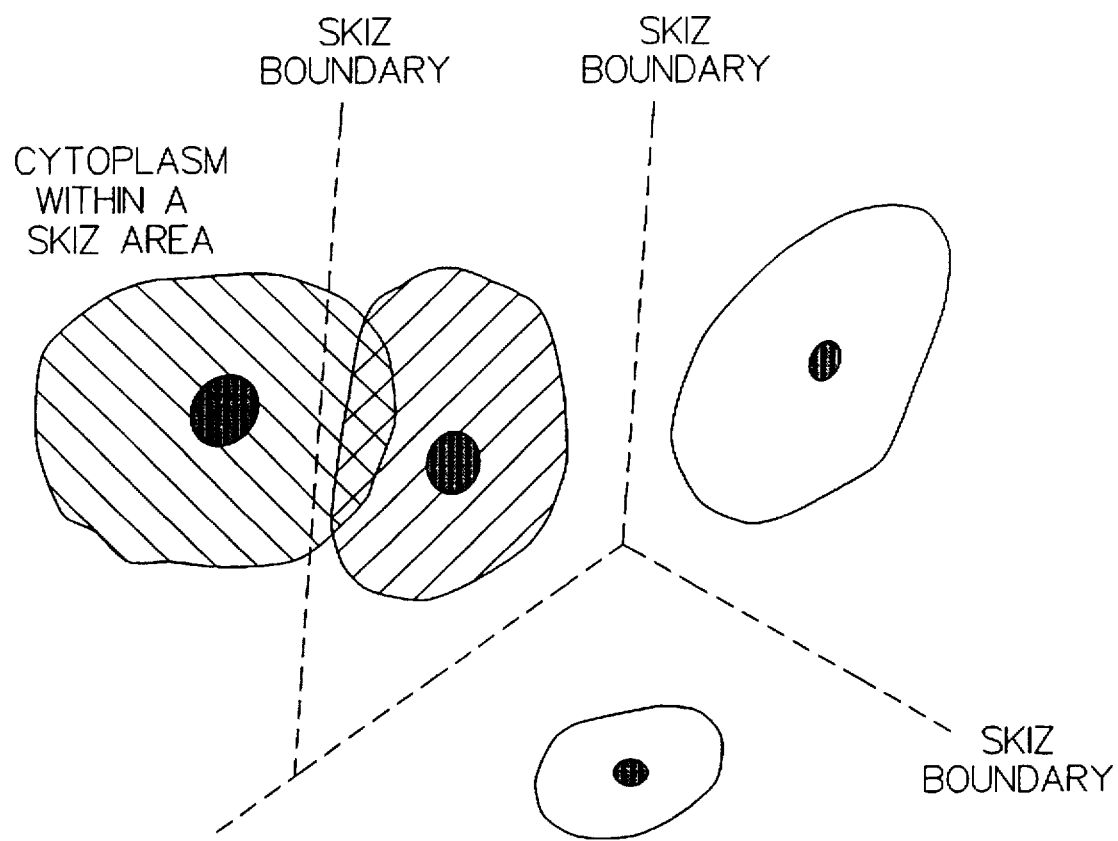
FIG. 4 shows a SKIZ boundary.

Some examples of object features used to identify reference cells are listed below.

float compactness is defined as perimeter*perimeter/area.

float area2 is the same feature as area, except the area of interest (labeled nuclear region) is first eroded by a 3×3 structure element (1-pixel wide).

float mod_N_C_ratio is A ratio between the nuclear area and the cytoplasm area. The cytoplasm for each nuclei is determined by taking only the cytoplasm area that falls inside of a SKIZ boundary between all nuclei objects. The area of the cytoplasm is the number of the cytoplasm pixels that are in the SKIZ area corresponding to the nuclei of interest. The edge of the image is treated as an object and therefore creates a SKIZ boundary as shown in FIG. 4.

cell_semi_isolated is A feature that can take on two values: 0.0 and 1.0 (1.0 indicates the nucleus is semi-isolated). A nucleus is determined to be semi-isolated when the center of its bounding box is a minimum euclidian pixel distance from all other nuclei (center of their bounding boxes). FIG. 3 shows a cell with a cell nucleus surrounded by a bounding box. The minimum distance that is used as a threshold is stored in the global floating point variable AlgSemiIsolatedDistanceMin (default is 50.0).

A number of features are designed to measure nuclear textures, the original image is blurred using a 5×5 binomial filter. A residue is created with the absolute magnitude differenced between the original and the blurred image.

The original image nucleus is assumed to contain information not only about the nucleus, but also about background matter. The gray levels recorded at each pixel of the nucleus summarize the optical density of all matter in the vertical column that contains the particular nucleus pixel. In other words, if the nucleus is located in a cytoplasm which itself is located in a mucus stream, the gray level values of the nucleus may reflect not only the nuclear matter, but also the cytoplasm and mucus in which the nucleus lies. To try to measure features of the nucleus without influence of the surroundings and to measure the nucleus surroundings, two regions have been defined around the nucleus. Two regions have been defined because of a lack of information about how much area around the nucleus is enough to identify what is happening in proximity to the nucleus.

The two regions are rings around each nucleus. The first ring expands 5 pixels out from the nucleus (box 7×7 and diamond 4) and is designated as the "small" ring. The second region expands 15 pixels out from the nucleus (box 15×15 and diamond 9) and is called the "big" ring.

Figure 5:
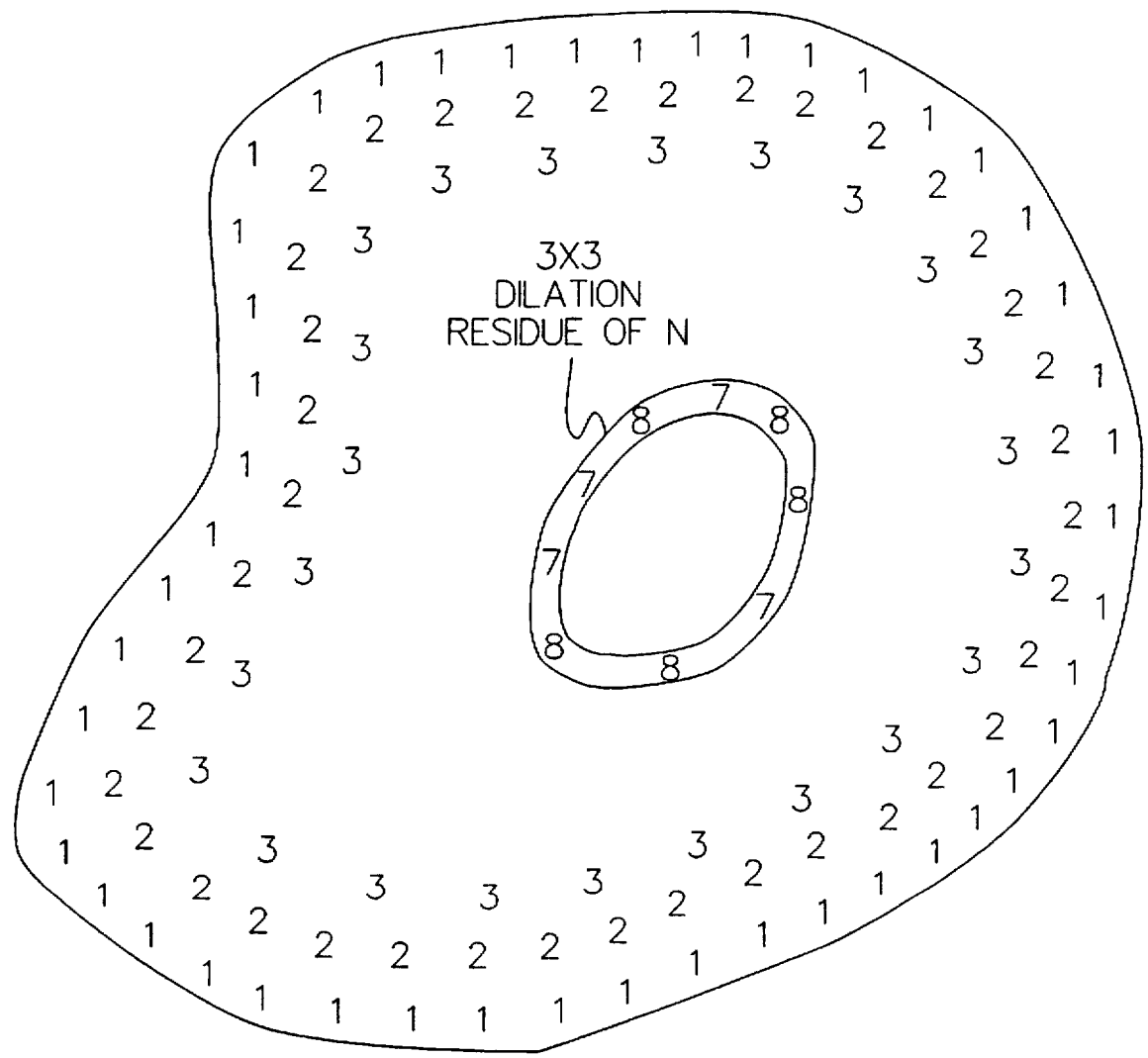
FIG. 5 shows a 3×3 dilation residue method of the invention.

Other features used to characterize reference cells include:

float big_blur_ave is A pixel average of blur residue image over the big ring area.

float nuc_blur_ave is A pixel average of blur residue image over the nuclear area.

float nc_score_alt_r4 is the median value of the 8 connect distance transform of the cytoplasm mask is found inside the 3×3 dilation residue of the nuclear mask. FIG. 5 shows a 3×3 dilation residue method of the invention. This value is always an integer since the discrete probability density function always crosses 0.5 at the integer values. Call this value as Y. The n feature is: nuclear area/(3.14*Y*Y).

A reference cell classifier detects the reference cells. The reference cell classifier uses stable features such as staining independent or relative features for classification. In addition, the classifier is designed to maintain high specificity and avoid false positives. In this way, the detected objects are most likely true reference cells. In a preferred embodiment of the implementation, the squamous intermediate cells in a Pap smear may be detected by the following rule:

If CSEMISOL>0.5 and MDNCRATO<=0.073325 and NCSCATr4<=0.15115 and NBLURAVE>4.6846 and BGBLUAVE<=4.5655 and AREA2>96.5 and COMPACT<=10.2183

Where CSEMISOL>0.5 requires the cell be an isolated one;

MDNCRATO<=0.073325 and NCSCATr4<=0.15115 are two rules which require the nuclear to cytoplasm size and radius ratio be lower than a limit (need to make sure the cytoplasm size are large with respect to nuclear size);

NBLURAVE>4.6846 requires the nucleus to have sufficient texture;

BGBLUAVE<=4.565 requires the cytoplasm area to be relatively smooth;

area2>96.6 requires the nucleus to be large enough; and COMPACT<=10.2183 requires the nuclear shape be round.

An object is classified as a reference cell only when all conditions are met. Note that no density features are used for squamous intermediate cell detection. This is because density is not a stable feature, it varies from slide to slide.

Important features of each detected reference cells are saved. The features include:

Morphological features such as nuclear size and shape

Density features such as nuclear Integrated Optical Density (IOD), nuclear mean optical density (OD), cytoplasm mean OD Texture features such as standard deviation of nuclear OD, average edge gradient of nucleus, etc.

Nuclear to cytoplasm contrast features such as OD difference, edge contrast, etc.

Slide reference features can be computed from the saved reference cell features. In a preferred embodiment of implementation, the slide reference features are: Means (m), medians ($m_o$), standard deviations ($\sigma$), and 10–90% spreads ($s_o$) of the features over all reference cells saved for the whole slide.

Calibrated feature extraction proceeds as follows. During the re-screening of the slide, significant objects are detected and object features are extracted. The extracted object features are calibrated by a feature combination strategy which combines object features with reference features in certain mathematical forms. Slide reference features are slide staining or squamous intermediate cell nuclear size related features as described above. In a preferred embodiment of implementation, six types of feature combination formulas are used. The unified formula of these six combinations is:

$$NewFeature = \frac{f - \alpha g}{\beta}$$

where $\alpha$ is evaluated to maximize the discrimination power of the resulting NewFeature and $\beta$ is a calibrated factor. The forms f and g for six types of combinations are listed in the following table.

| Combination Type | f | g |
|---|---|---|
| Type 1 | s | r |
| Type 2 | s/r | 1/4 |
| Type 3 | s/r2 | r1/r2 |
| Type 4 | $\frac{Log(s) |r1|}{|r2|}$ | $\frac{Log(r1) |r1|}{|r2|}$ |
| Type 5 | $\frac{\log(s)}{\log(r)}$ | $\frac{1}{\log(r)}$ |
| Type 6 | log(s) | log(r) | where s is object feature and r, r1 and r2 are slide reference features. Note that where log(x) is indicate log(|x|+0.001) is used; where x=s,r,r1 for the singularity of the logarithmic function, and we set r2=10⁻⁶ if r2<10⁻⁶. For Type 2, we set r=0.01*sgn(r)*R if |r|<0.01*R where R is maximum of |r| for all training data where the function sgn(.) is $$sgn(x) = \begin{cases} 1; & x \geq 0 \\ -1; & x < 0 \end{cases}$$

In the same way, for Type 5, we set Log(r)=0.01 * sgn(log(r)) * log(R̂) if |log(|r|+0.001)|<0.01*log(R̂) where log(R̂) is maximum of |log(|r|+0.001)| for all training data.

As shown above, there are a variety of combinations of the calibrated features. Feature selection methods such as the stepwise discriminate analysis (see "Numerical Evaluation of Cytologic Data: VII. Multivariate Significance Tests," by Bartels P. H., Analyt Quant Cytol 3:1–8, 1981.) can be used to select the features having the highest discriminate power. The calibrated features along with the original object features are used to train the object classifier.

In a preferred embodiment of the invention, the classifiers were constructed through a training process as described in "A Processing Strategy for Automated Papanicolaou Smear Screening" by Lee et al. in the Analytical and Quantitative Cytology and Histology, Vol. 14 No. 5, pp. 415–425, October 1992. The Classification And Regression Trees (CART) (see "Classification And Regression Trees", by Breiman et al., Belmont, Calif., Wadsworth, 1984) is used as the basis for the classifiers.

Slide calibration features are also extracted from the reference features. These features can be used to normalize slide features. In a preferred embodiment of the invention, the slide calibration features include:

slide reference features;

number of reference cells detected from the whole slide;

number of reference cells detected from the whole slide/ number of objects detected from the whole slide;

mean-medians for each reference feature;

mean-medians/standard deviation for each reference feature;

10–90% spread-standard deviation for each reference feature; and

10–90% spread-standard deviations/standard deviation for each reference feature.

Object classification results along with the slide calibration features can be used for slide classification. The slide classifier can again be constructed through a training process as described in "A Processing Strategy for Automated Papanicolaou Smear Screening" by Lee et al. in the Analytical and Quantitative Cytology and Histology, Vol. 14 No. 5, pp. 415–425, October 1992. The Classification And Regression Trees (CART) (See "Classification And Regression Trees", by Breiman et al., Belmont, Calif., Wadsworth, 1984.) can be used as the basis for the classifiers. The output of the slide classifier is the analysis score or anomaly score.

Figure 6:
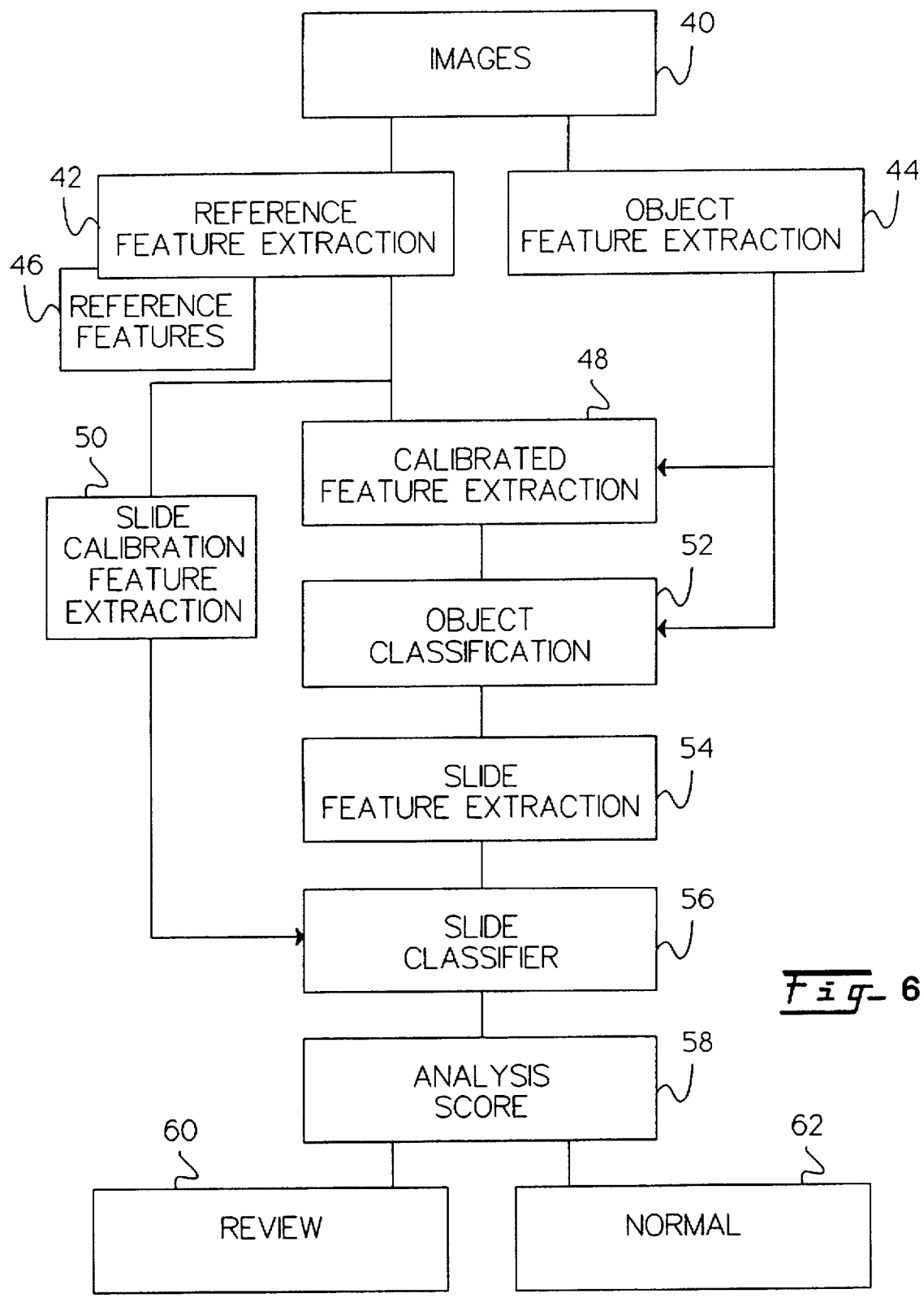
FIG. 6 shows one example of a self calibrating biological specimen analysis apparatus.

Refer now to FIG. 6, one example of a self calibrating biological specimen analysis apparatus is shown. The apparatus includes a reference feature extractor 42 to detect reference features 46 in at least one biological specimen image 40, wherein the reference feature extractor has a reference feature output. An object feature extractor 44 detects object features in at least one biological specimen, wherein the object feature extractor has an object feature output. A calibrated feature extractor 48 is connected to the reference feature output and the object feature output, wherein the calibrated feature extractor has a calibrated feature output. An object classifier 52 is connected to the object feature output and the calibrated feature output. The object classifier 52 has a object classification result output. A slide feature extractor 54 is connected to the object classification result output, wherein the slide feature extractor has a slide feature output. A slide calibration feature extractor 50 is connected to the reference feature output, wherein the slide calibration feature extractor 50 has a slide calibration feature output. A slide classifier 56 is connected to the slide calibration feature output and the slide feature output, wherein the slide classifier has an analysis score output. An analysis score thresholder 58 is connected to the analysis score output, having a normal indicator output 62 and a review indicator output 60. In one embodiment the biological specimen may be prepared by the Papanicolaou method.

Figure 7:
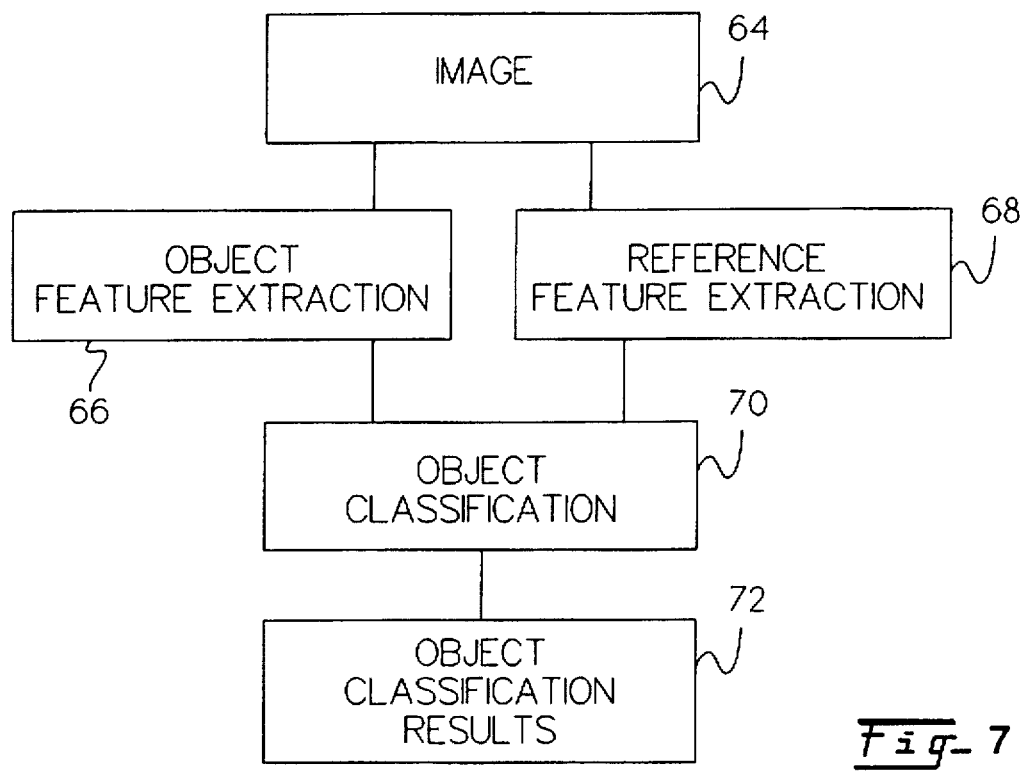
FIG. 7 shows another example of a self calibrating biological specimen analysis apparatus.

Refer now to FIG. 7, another example of a self calibrating biological specimen analysis apparatus is shown. The apparatus includes a reference feature extractor 68 to detect reference features in at least one biological specimen image 64, wherein the reference feature extractor has a reference feature output. An object feature extractor 66 detects object features in at least one biological specimen, wherein the object feature extractor has an object feature output. An object classifier 70 is connected to the object feature output and the calibrated feature output. The object classifier 70 has a object classification result output 72.

Figure 8:
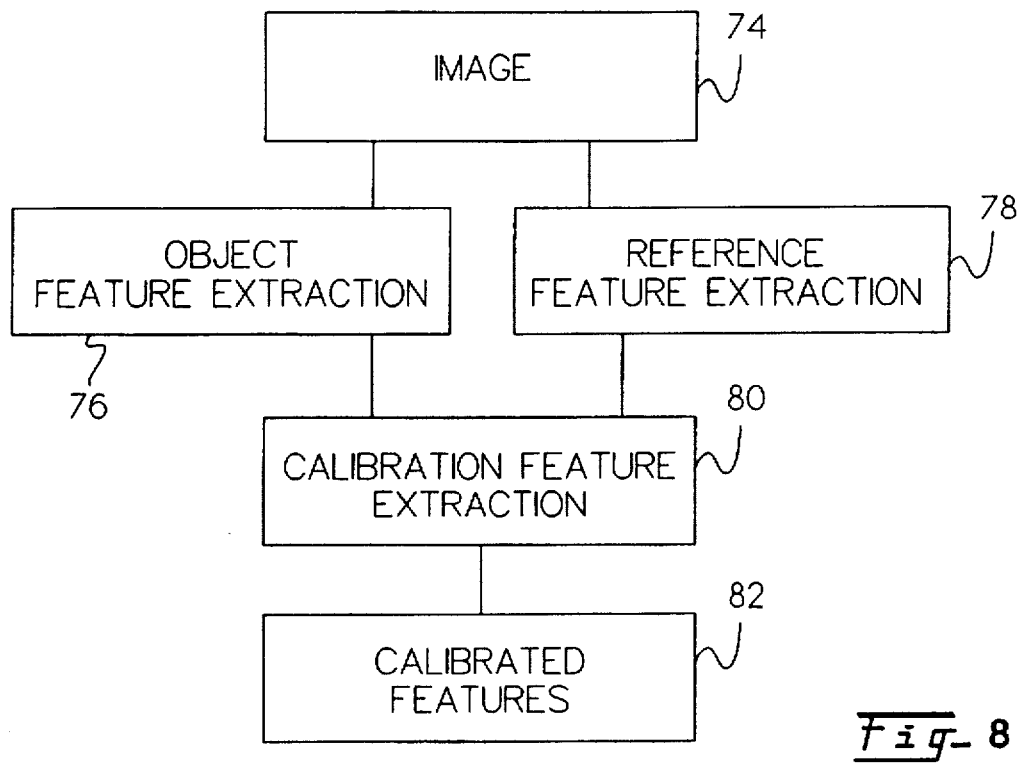
FIG. 8 shows yet another example of a self calibrating biological specimen analysis apparatus.

Refer now to FIG. 8, another example of a self calibrating biological specimen analysis apparatus is shown. The apparatus includes a reference feature extractor 78 to detect reference features in at least one biological specimen image 74, wherein the reference feature extractor has a reference feature output. An object feature extractor 76 detects object features in at least one biological specimen, wherein the object feature extractor has an object feature output. A calibrated feature extractor 80 is connected to the reference feature output and the object feature output, wherein the calibrated feature extractor has a calibrated feature output 82.

Figure 9:
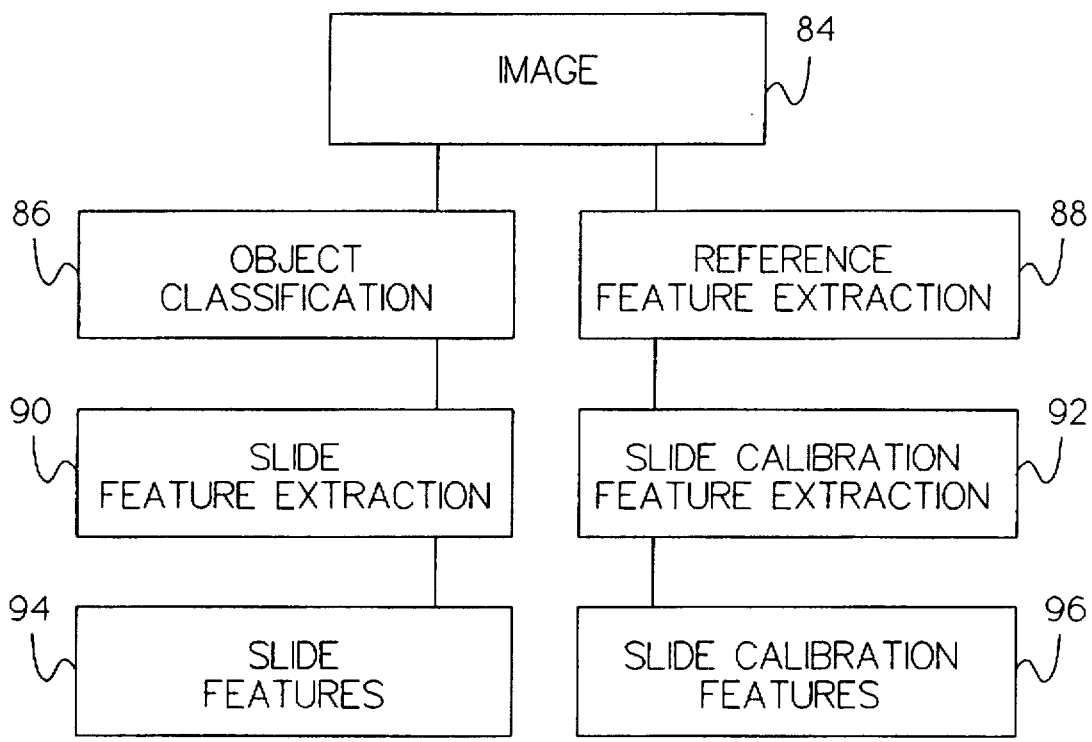
FIG. 9 shows still another example of a self calibrating biological specimen analysis apparatus.

Refer now to FIG. 9, another example of a self calibrating biological specimen analysis apparatus is shown. The apparatus includes a reference feature extractor 88 to detect reference features in at least one biological specimen image 84, wherein the reference feature extractor has a reference feature output. A slide calibrated feature extractor 92 is connected to the reference feature output, wherein the slide calibrated feature extractor has a calibrated feature output 96. An object classifier 86 is connected to the object feature output and the calibrated feature output. The object classifier 86 has a object classification result output. A slide feature extractor 90 is connected to the object classification result output, wherein the slide feature extractor has a slide feature output 94.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A self calibrating biological specimen analysis apparatus for a biological specimen under analysis, the self calibrating biological specimen analysis apparatus comprising:

(a) imaging means for obtaining at least one image of said biological specimen under analysis, wherein the imaging means has an image output;

(b) an automatic calibration feature extraction means, connected to receive the image output, for generating at least one calibrated feature output extracted from cell objects of said biological specimen wherein the automatic calibration feature extraction means self adjusts to match the situation of said biological specimen so that said biological specimen is characterized by the at least one calibrated feature output;

(c) an object classifier connected to the calibrated feature output wherein the object classifier has an object classification result output; and (d) a biological specimen classifier connected to the object classification result output, wherein the biological specimen classifier has an analysis score output.

2. The self calibrating biological specimen analysis apparatus of claim 1 wherein the automatic calibration feature extraction means further comprises an object feature extractor and a reference feature extractor, wherein the object feature extractor is connected to receive the image output, and the object feature extractor has an object feature extractor output, and wherein the reference feature extractor is connected to receive the image output, and the reference feature extractor has a reference feature extractor output.

3. The self calibrating biological specimen analysis apparatus of claim 2 wherein the object classifier is further connected to the object feature extractor output.

4. The self calibrating biological specimen analysis apparatus of claim 2 wherein the biological specimen classifier further comprises a slide calibration feature extractor connected to the reference feature extractor output, wherein the slide calibration feature extractor has a slide calibration feature output.

5. The self calibrating biological specimen analysis apparatus of claim 1 further comprising an analysis score thresholder connected to the analysis score output, wherein the analysis score thresholder compares the analysis score output to a review threshold, wherein the analysis score thresholder has a normal indicator output and a review indicator output.

6. The apparatus of claim 1 wherein the biological specimen is prepared by the Papanicolaou method.

7. The apparatus of claim 1 wherein the biological specimen is a gynecological specimen.

8. The apparatus of claim 1 further comprising a computer processor.

9. The biological specimen analysis self calibrating apparatus of claim 1 further comprising an automated microscope.

10. An object classifier apparatus for an object in a biological specimen under analysis by a self calibrating biological specimen analyzer, the object classifier apparatus comprising:
   (a) a reference feature extractor to detect reference features in an image of the biological specimen under analysis, wherein the reference feature extractor has a reference feature output;
   (b) an object feature extractor to detect object features in the image, wherein the object feature extractor has an object feature output;
   (c) an automatic calibration feature extractor connected to the reference feature output and the object feature output, wherein the automatic calibration feature extractor has a calibrated feature output extracted from cell objects of the biological specimen wherein the automatic calibration feature extractor enables the self calibrating biological specimen analyzer to self adjust to match the situation of the biological specimen so that the biological specimen is characterized by the calibrated feature output; and
   (d) an object classifier connected to the calibrated feature output, wherein the object classifier has an object classification result output.

11. A feature extractor apparatus for features found in an image of a biological specimen under analysis by a self calibrating biological specimen analyzer, the feature extractor apparatus comprising:
   (a) a reference feature extractor to detect reference features in the image, wherein the reference feature extractor has a reference feature output;
   (b) an object feature extractor to detect object features in the image, wherein the object feature extractor has an object feature output; and
   (c) an automatic calibration feature extractor connected to the reference feature output and the object feature output, wherein the automatic calibration feature extractor has a calibrated feature output extracted from cell objects of the biological specimen wherein the automatic calibration feature extractor enables the self calibrating biological specimen analyzer to self adjust to match the situation of the biological specimen so that the biological specimen is characterized by the calibrated feature output.

12. A slide feature extraction apparatus for features found in an image of a biological specimen under analysis by a self calibrating biological specimen analyzer, the slide feature extraction apparatus comprising:
   (a) a reference feature extractor to detect reference features in the image, wherein the reference feature extractor has a reference feature output;
   (b) an object classifier connected to receive the image, having an object classifier output;
   (c) a slide feature extractor connected to the object classifier output, wherein the slide feature extractor has a slide feature output; and
   (d) an automatic slide calibration feature extractor connected to the reference feature output, wherein the automatic slide calibration feature extractor has a slide calibration feature output extracted from cell objects of the biological specimen wherein the automatic slide calibration feature extractor enables the self calibrating biological specimen analyzer to self adjust to match the situation of the biological specimen so that the biological specimen is characterized by the slide calibration feature output.

13. A self calibrating biological specimen analysis apparatus for a biological specimen under analysis, the self calibrating biological specimen analysis apparatus comprising:
   (a) a reference feature extractor to detect reference features in an image of the biological specimen under analysis, wherein the reference feature extractor has a reference feature output;
   (b) an object feature extractor to detect object features in the image, wherein the object feature extractor has an object feature output;
   (c) a calibrated feature extractor connected to the reference feature output and the object feature output, wherein the calibrated feature extractor has a calibrated feature output;
   (d) an object classifier connected to the object feature output and the calibrated feature output, wherein the object classifier has a object classification result output;
   (e) a slide feature extractor connected to the object classification result output, wherein the slide feature extractor has a slide feature output;
   (f) an automatic slide calibration feature extractor connected to the reference feature output, wherein the automatic slide calibration feature extractor has a slide calibration feature output extracted from cell objects of the biological specimen wherein the automatic slide calibration feature extractor enables the self calibrating biological specimen analysis apparatus to self adjust to match the situation of the biological specimen so that the biological specimen is characterized by the at least one calibrated feature output;
   (g) a slide classifier connected to the slide calibration feature output and the slide feature output, wherein the slide classifier has an analysis score output; and
   (h) an analysis score thresholder, connected to the analysis score output, having a normal indicator output and a review indicator output.

14. The apparatus of claim 13 wherein the biological specimen is prepared by the Papanicolaou method.

15. The apparatus of claim 13 wherein the biological specimen is a gynecological specimen.

16. A method of calibrating a biological specimen analysis system for a biological specimen under analysis comprising the steps of:
   (a) automatically detecting reference features in said biological specimen;
   (b) automatically detecting object features from said biological specimen;
   (c) automatically detecting calibrated features from the reference features and object features;
   (d) automatically classifying objects in said biological specimen based on the calibrated features and object features to provide object classification results;

(e) automatically detecting slide calibration features from the reference features;

(f) automatically extracting slide features from the object classification results; and (g) automatically classifying biological specimen slides as either normal or needing review based on the slide calibration features and slide features to enable the biological specimen analysis system to self adjust to match the situation of the biological specimen.

17. The apparatus of claim 16 wherein the biological specimen is prepared by the Papanicolaou method.

18. The apparatus of claim 16 wherein the biological specimen is a gynecological specimen.

19. A method of feature calibration for features found in a biological specimen under analysis by a self calibrating biological specimen analyzer, the method comprising the steps of:

(a) automatically detecting reference features in the biological specimen under analysis; and (b) automatically calibrating the reference features to provide calibrated features for use with an automated calibration feature extractor that enables the self calibrating biological specimen analyzer to self adjust to match the situation of the biological specimen under analysis, wherein the calibrated features characterize the biological specimen.

20. The method of claim 19 further comprising the step of automatically detecting a reference cell in a biological specimen image of the biological specimen under analysis comprising:

(a) detecting objects in the biological specimen image that resemble isolated cells;

(b) extracting staining independent features from the objects in the biological specimen image that resemble isolated cells; and (c) classifying the staining independent features to detect reference cells.

21. The method of claim 20 wherein the reference cell is a squamous intermediate cell.

22. The method of claim 19 further including the steps of:

(a) determining if a cytoplasm size is large with respect to nuclear size;

(b) measuring at least one texture feature of a nucleus;

(c) determining if a cytoplasm area is relatively smooth;

(d) determining if the nucleus is greater than a predetermined size; and (e) determining if a nuclear shape is nearly round.

23. The method of claim 19 further comprising the steps of:

(a) detecting a cytoplasm size and radius;

(b) computing a nuclear to cytoplasm size and radius ratio; and (c) determining if the radius ratio is lower than a predetermined limit.

24. A calibrated feature extraction method for a screened biological slide, the calibrated feature extraction method comprising the steps of:

(a) automatically detecting a slide reference on the screened biological slide;

(b) automatically extracting slide reference features from said slide reference;

(c) automatically detecting an object on the screened biological slide;

(d) automatically extracting object features from said object; and (e) automatically calibrating the object features by combining the object features and slide reference features.

25. The calibrated feature extraction method of claim 24 wherein the slide reference features comprise slide staining, reference cell nuclear to cytoplasm density contrast, and nuclear size related features.

26. The calibrated feature extraction method of claim 24 further comprising a computer processor to process feature combination formulas.

27. The calibrated feature extraction method of claim 24 wherein the slide reference features and the object features are selected by stepwise discriminate analysis.

28. The calibrated feature extraction method of claim 24 wherein the calibrated features and the object features are used to train an object classifier.

* * * * *

UNITED STATES PATENT AND TRADEMARK OFFICE
CERTIFICATE OF CORRECTION

PATENT NO. : 5,787,189
DATED : July 28, 1998
INVENTOR(S) : Lee et al.

It is certified that error appears in the above-identified patent and that said Letters Patent is hereby corrected as shown below:

Column 4, line 3, delete the "." after the word "re-scanned".

Column 4, line 22, delete the phrase "detect ability" and replace it with -- detectability --.

Column 4, line 34, delete the word "A" and replace it with -- a --.

Column 4, line 42, delete the word "A" and replace it with -- a --.

Column 5, line 10, delete the word "A" and replace it with -- a --.

Column 5, line 12, delete the word "A" and replace it with -- a --.

Column 7, line 4, before number "10" insert -- | --.

Signed and Sealed this

Twelfth Day of January, 1999

Attest:

Attesting Officer

*Acting Commissioner of Patents and Trademarks*